US005506585A

United States Patent [19]
Shiratori

[11] Patent Number: 5,506,585
[45] Date of Patent: Apr. 9, 1996

[54] CONTINUOUS WAVE RADAR EFFECTIVE FOR PREVENTING COLLISION OF MOBILE OBJECT

[75] Inventor: Hideki Shiratori, Sendai, Japan

[73] Assignee: Fujitsu Limited, Kanagawa, Japan

[21] Appl. No.: 272,261

[22] Filed: Jul. 8, 1994

[30] Foreign Application Priority Data

Dec. 28, 1993 [JP] Japan .................................. 5-336446

[51] Int. Cl.$^6$ .................................................. G01S 13/36
[52] U.S. Cl. .................................. 342/71; 342/114
[58] Field of Search ................................ 342/29, 41, 70, 342/71, 72, 114, 194

[56] References Cited

U.S. PATENT DOCUMENTS

| | | | |
|---|---|---|---|
| 3,665,443 | 5/1972 | Galvin | 367/94 |
| 4,083,049 | 4/1978 | Mattern et al. | 342/28 |
| 4,219,812 | 8/1980 | Rittenbach | 342/110 |
| 4,499,467 | 2/1985 | Rittenbach | 342/109 |
| 4,888,744 | 12/1989 | Keeler | 367/90 |

FOREIGN PATENT DOCUMENTS

| | | | |
|---|---|---|---|
| 580751 | 8/1959 | Canada | 342/114 |
| 4107112 | 9/1992 | Germany. | |
| 1403358 | 8/1975 | United Kingdom. | |
| 1600430 | 10/1981 | United Kingdom. | |
| 2266207 | 10/1993 | United Kingdom. | |

OTHER PUBLICATIONS

IEEE Standard Dictionary of Electrical and Electronics Terms, Third Edition, 1984, pp. 186–187.
Proceedings Letters, Proceedings Of The IEEE, Mar. 1977, p. 493.

Primary Examiner—Stephen C. Bentley

[57] ABSTRACT

A continuous wave radar for detecting a relative velocity between a target and a mobile object where the radar is loaded, and for detecting whether the mobile object is relatively approaching to or separating from the target. The radar has a hybrid circuit for branching an oscillation signal of a fixed frequency outputted from an oscillator into two oscillation signals. A transmitting antenna is provided for irradiating one of the oscillation signals branched by the hybrid circuit, and a receiving antenna is provided for receiving radio waves reflected from the target. The continuous wave radar further has an image cancel mixer for detecting, on the basis of the frequency of the other oscillation signal branched by the hybrid circuit, a first signal of an upper sideband frequency and a second signal of a lower sideband frequency of the received signal obtained via the receiving antenna. A signal processing circuit is provided for detecting the relative velocity of the mobile object to the target by processing the first and second signals, and detecting a relative approach of the target by processing the first signal or detecting a relative separation of the target by processing the second signal.

2 Claims, 8 Drawing Sheets

CONTINUOUS WAVE RADAR EFFECTIVE FOR PREVENTING COLLISION OF MOBILE OBJECT

BACKGROUND OF THE INVENTION

1. Field of the Invention

The present invention relates to a CW (continuous wave) radar and, more particularly, to a CW radar loadable in a mobile object such as a car to effectively prevent collision thereof.

2. Description of the Related Art

This CW radar is loaded in a mobile object such as a car and detects its relative velocity to a target such as a preceding car or an obstacle by irradiating electric waves of a high frequency band and receiving the reflected waves. There is another type known as an FM (frequency modulation)-CW radar which detects both the relative velocity and the relative distance to a target by irradiating frequency-modulated high frequency waves to the target and receiving the reflected waves therefrom. It is desired that any of such CW radars meets various requirements including low noise, a small-sized structure and low production cost. These requirements are remarkably increasing, particularly in the car-loadable type which has recently indicated urged needs.

Figure 1:
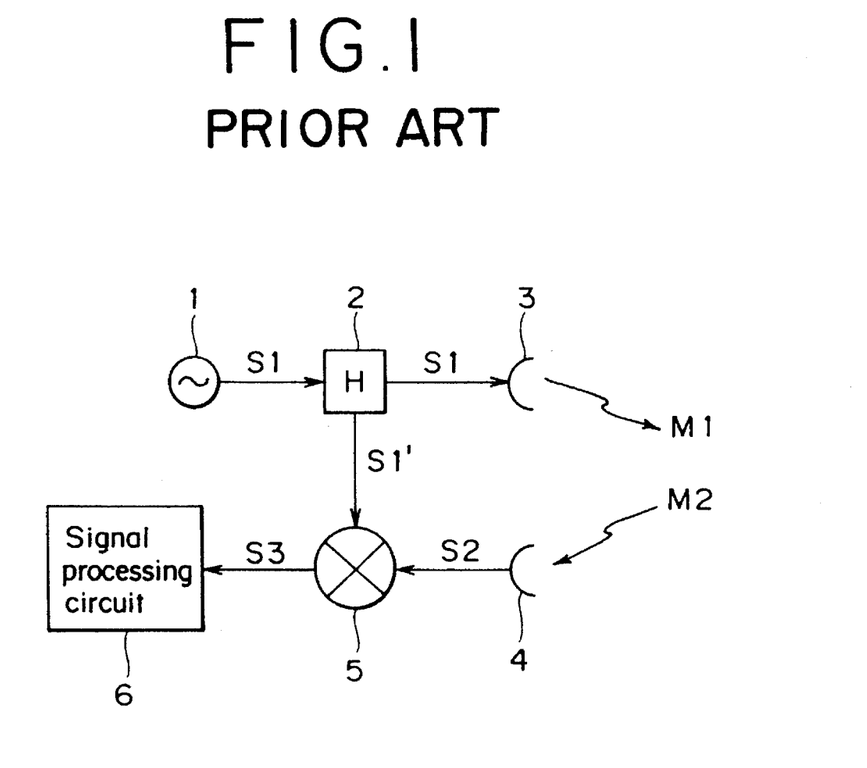
FIG. 1 is a block diagram of a conventional continuous wave radar.
Figure 2:
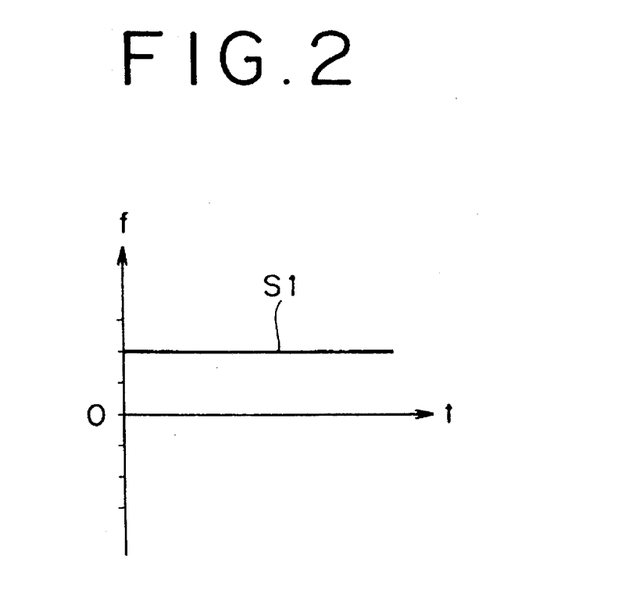
FIG. 2 graphically shows the relationship between the frequency of a transmitted signal S1 shown in FIG. 1 and the time.
Figure 3:
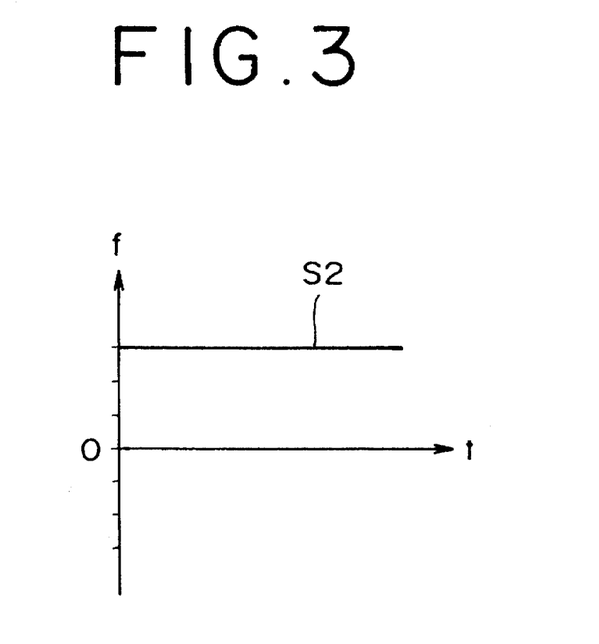
FIG. 3 graphically shows the relationship between the frequency of a received signal S2 shown in FIG. 1 and the time.
Figure 4:
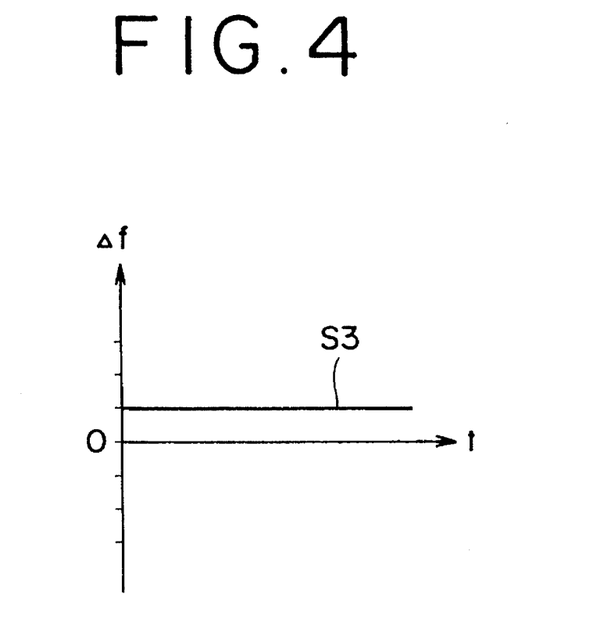
FIG. 4 graphically shows the relationship between the frequency (beat frequency) of a signal S3 shown in FIG. 1 and the time.

FIG. 1 is a block diagram of a conventional CW radar which will now be described below. It is assumed here that this CW radar is loaded in a car. The CW radar shown in this diagram is a type utilizing Doppler shift to measure the relative velocity by detecting a beat frequency (FIG. 4) which represents the frequency difference between a CW transmitted signal of a fixed frequency (FIG. 2) and a reflected wave (FIG. 3) of which frequency has a deviation due to the Doppler shift. FIGS. 2 to 4 graphically show the relationship between the signal frequency f and the time t, where a signal S2 in FIG. 3 is formed with a frequency shift of a signal S1 shown in FIG. 2, and a signal S3 in FIG. 4 is obtained on the basis of the difference between the signals S1 and S2.

The CW radar shown in FIG. 1 comprises an oscillator 1, a hybrid circuit 2, a transmitting antenna 3, a receiving antenna 4, a mixer 5, and a signal processor 6 including an MPU (microprocessor). The oscillator 1 generates an RF signal S1 of a fixed frequency shown in FIG. 2. The RF signal S1 is branched by the hybrid circuit 2, and one signal S1 thereof is outputted forward as a radio wave M1 from the antenna 3 via an unshown transmitter. The radio wave M1 thus outputted is reflected by, e.g., an unshown preceding car and then is returned as a reflected wave M2. The reflected wave M2 is received by the antenna 4 and is inputted to an unshown receiver. An output signal S2 of the receiver having a frequency shown in FIG. 3 is mixed by a mixer 5 with another signal S1' outputted from the hybrid circuit 2. A signal S3 of a frequency shown in FIG. 4 is produced as a result of such mixing and then is outputted to the signal processor 6, which calculates the relative velocity between the radar-loaded car and the preceding car on the basis of the signal S3.

Figure 6:
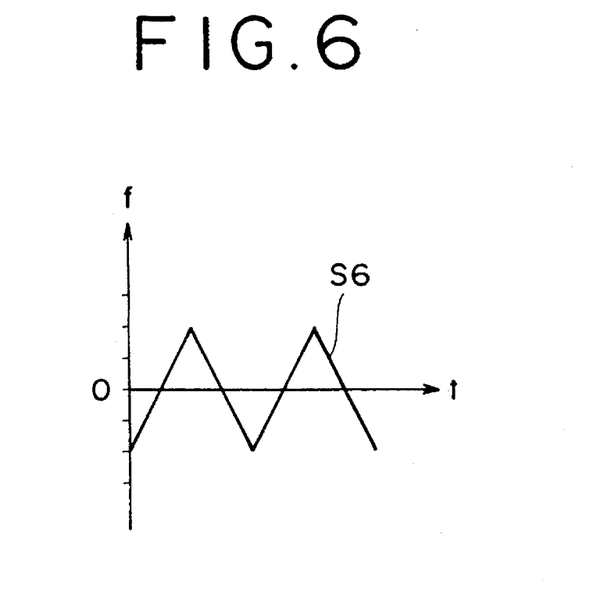
FIG. 6 graphically shows the relationship between the frequency of a transmitted signal S6 shown in FIG. 5 and the time.
Figure 7:
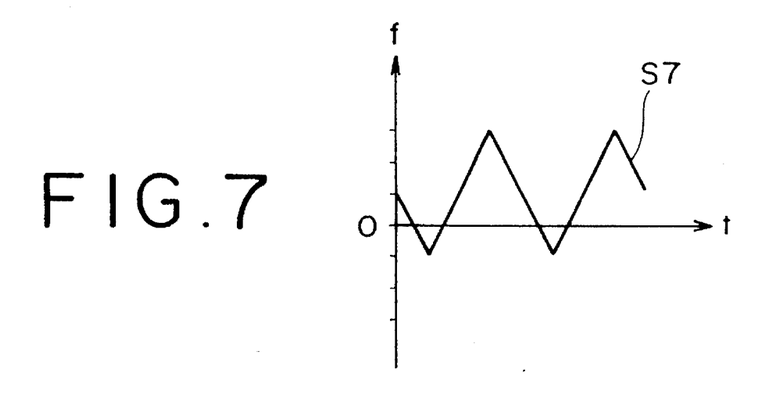
FIG. 7 graphically shows the relationship between the frequency of a received signal S7 shown in FIG. 5 and the time.
Figure 8:
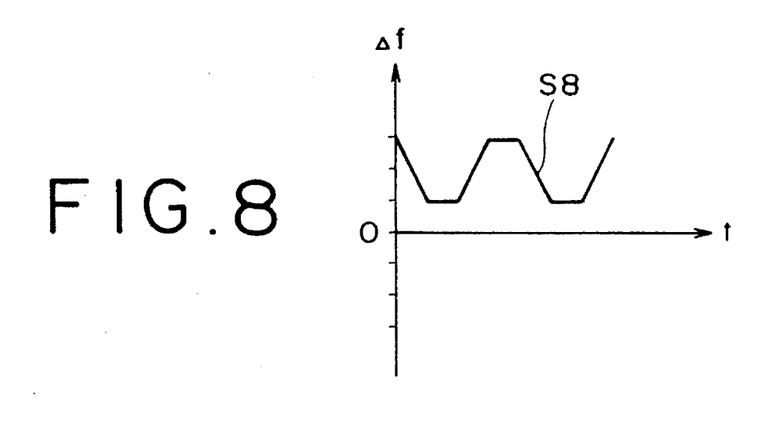
FIG. 8 graphically shows the relationship between the frequency (beat frequency) of a signal S8 shown in FIG. 5 and the time.
Figure 9:
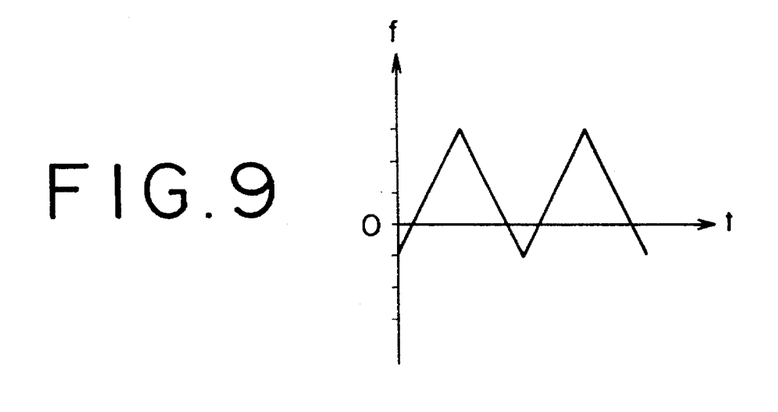
FIG. 9 illustrates a frequency shift caused in the transmitted signal S6 shown in FIG. 6.
Figure 10:
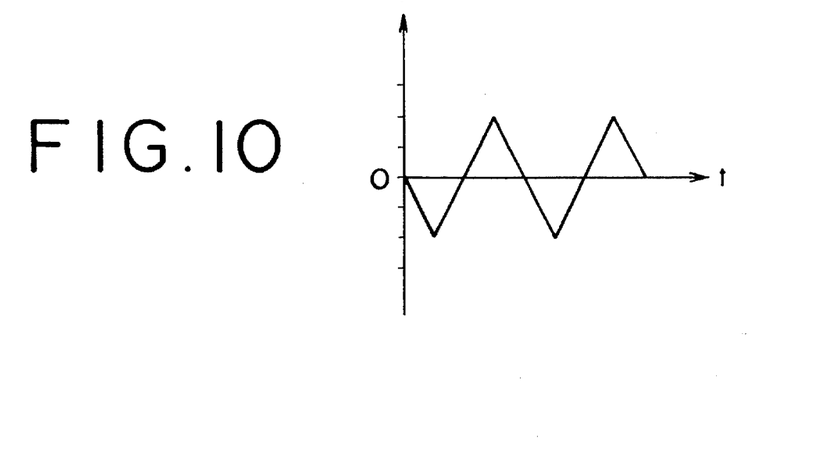
FIG. 10 illustrates a phase delay caused in the transmitted signal S6 shown in FIG. 6.

An FM-CW radar will now be described below with reference to FIG. 5. It is supposed in this case also that the FM-CW radar is loaded in a car. The FM-CW radar of FIG. 5 detects the relative velocity and the relative distance by detecting a beat frequency (FIG. 8) which represents the difference between a frequency-modulated transmitted signal (FIG. 6) and a reflected wave thereof (FIG. 7). The reflected wave is a result of combining a signal (FIG. 9), which is produced from the transmitted signal of FIG. 6 with a frequency deviation caused due to the Doppler shift, with a signal (FIG. 10) produced from the transmitted signal with a phase delay due to the propagation distance.

Figure 5:
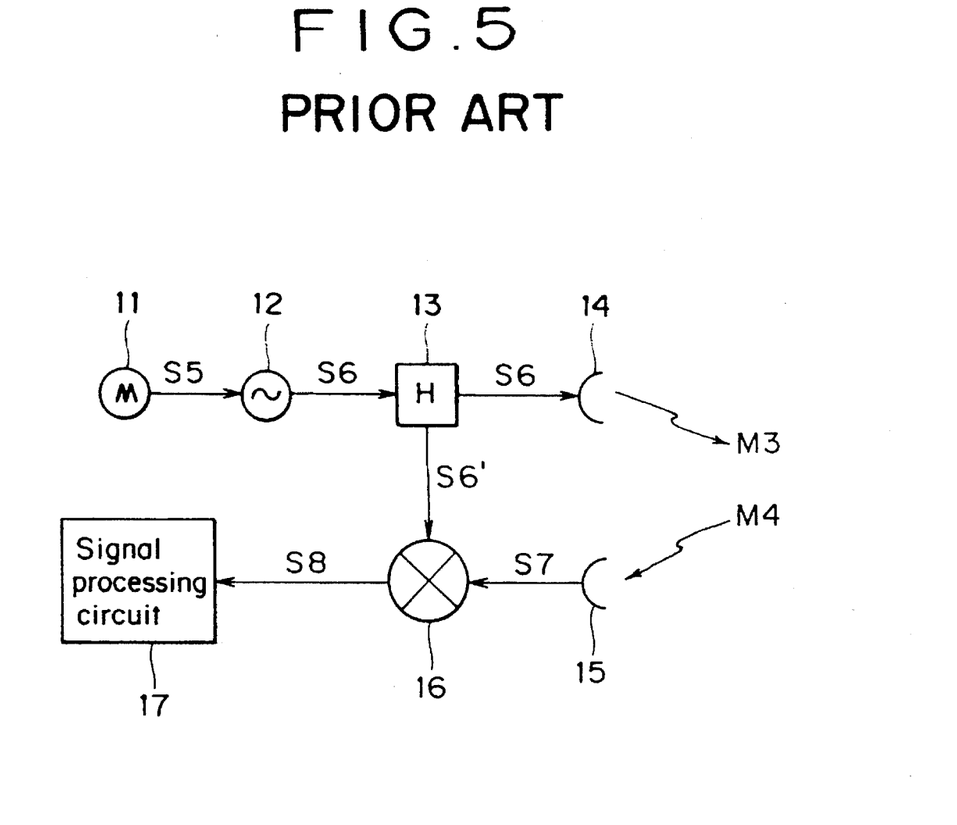
FIG. 5 is a block diagram of a conventional FM continuous wave radar.

The FM-CW radar shown in FIG. 5 comprises a modulating signal generator 11, a voltage controlled oscillator 12, a hybrid circuit 13, a transmitting antenna 14, a receiving antenna 15, a mixer 16, and a signal processor 17 including an MPU (microprocessor). The modulating signal generator 11 generates a triangular modulating signal S5 of a predetermined frequency and supplies the same to the voltage controlled oscillator 12. The modulating signal S5 is used for frequency-modulating the oscillation signal obtained from the voltage controlled oscillator 12. More specifically, the voltage controlled oscillator 12 produces a signal S6 of FIG. 6 which is a result of frequency-modulating the oscillation signal with the triangular modulating signal S5. The frequency of the output signal S6 obtained from the voltage controlled oscillator 12 is varied by changing the level of the triangular modulating signal.

The signal S6 thus obtained is branched in the hybrid circuit 13, and one signal S6 thereof is outputted forward as a radio wave M3 from the antenna 14. The outputted radio wave M3 is reflected by, e.g., a preceding car and then is returned therefrom as a reflected wave M4. The reflected wave M4 is received by the antenna 15, from which a signal S7 shown in FIG. 7 is obtained. Subsequently this signal S7 is mixed in the mixer 16 with the other signal S6' (FIG. 6) outputted from the hybrid circuit 13. A signal S8 of FIG. 8 obtained through such mixing is outputted to the signal processor 17. Since the signal S8 is a mixture of the Doppler frequency component obtained from the reflected wave M4 and the frequency component outputted from the voltage controlled oscillator 12, it becomes possible to compute the relative velocity and the relative distance between the radar-loaded car and the other car by detecting and calculating the frequency component in the signal processor 17.

In the conventional FM-CW radar shown in FIG. 5, there exists a problem that since the oscillation signal from the voltage controlled oscillator 12 is frequency-modulated, AM (amplitude modulation) noise is generated to consequently fail in achieving proper calculations of the relative velocity and the relative distance. As the oscillation signal of the voltage controlled oscillator 12 has frequency characteristics, it follows that an AM component corresponding to the oscillation signal is produced in the component element of the mixer 16. The frequency of such AM component caused with frequency modulation is approximately equal to the beat frequency, which is hardly cut by means of a filter or the like and is thereby left as a noise component. Meanwhile, if any other means is contrived to suppress such AM noise, the whole structure of the radar is complicated and rendered greater in scale to eventually become unpractical in use.

Figure 11:
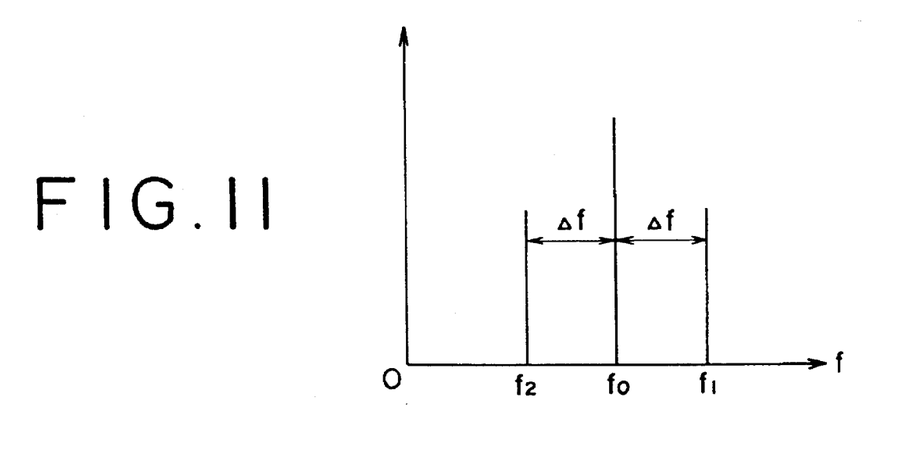
FIG. 11 is a frequency spectrum diagram of the transmitted waves and the received waves at the time of an approach and a separation of a target.

Since the CW radar shown in FIG. 1 is capable of detecting merely the relative velocity alone, there arises a problem that it is impossible to detect whether the target is relatively separating or approaching. In the CW radar of FIG. 1, the frequency f0 of the transmitted signal S1 has such a frequency spectrum as shown in FIG. 11. In this diagram, f1 denotes the frequency of the received signal S2 when the target is relatively approaching, and f2 denotes the frequency of the received signal S2 when the target is relatively separating. As is obvious from FIG. 11, the frequency f1 of the received signal deviates to be higher when the target is relatively approaching, while the frequency f2 of the received signal S2 deviates to be lower when the target is relatively separating.

Figure 12:
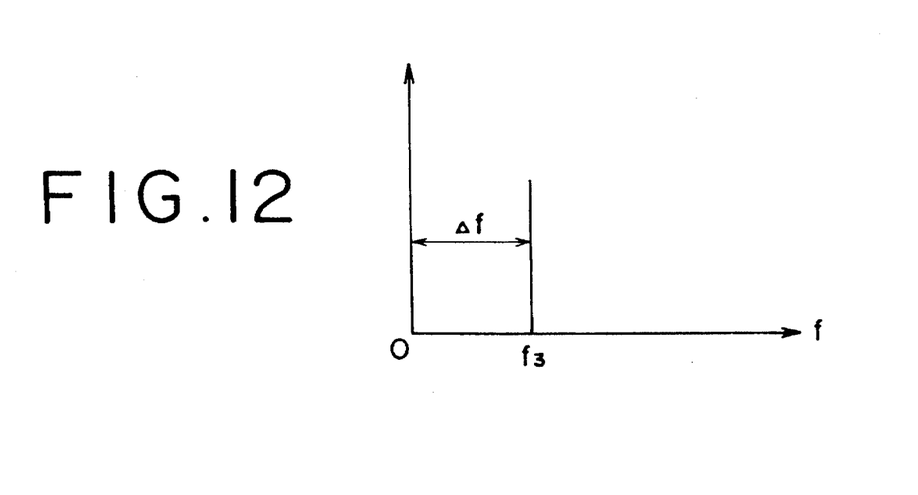
FIG. 12 is a frequency spectrum diagram of an output signal from a mixer shown in FIG. 1.

However, the frequency f3 of a signal S3 of FIG. 12 obtained by processing the received signal S2 in the mixer 5 represents the mere difference between the frequency f0 of the transmitted signal S1 and the frequency f1 or f2 of the received signal S2. Therefore it is impossible to discriminate between the frequency at the time of relative approach and the frequency at the time of relative separation.

SUMMARY OF THE INVENTION

It is therefore an object of the present invention to provide a continuous wave radar which, when loaded in a mobile object, is capable of detecting the relative velocity between the mobile object and a target and is further capable of detecting whether the mobile object is relatively approaching to or separating from the target.

Another object of the present invention resides in providing a continuous wave radar which can be constructed in a down-sized simple structure without a disadvantage of generating any AM noise and is effective to prevent collision of the mobile object.

In accordance with an aspect of the present invention, there is provided a continuous wave radar comprising an oscillation means for producing an oscillation signal of a fixed frequency; a first branch means operatively connected to the oscillation means for branching the oscillation signal into two signals; a transmitting antenna connected to the first branch means for irradiating one of the oscillation signals branched by the first branch means; a receiving antenna for receiving reflected waves irradiated originally from the transmitting antenna and reflected by a target; a first mixer operatively connected to the receiving antenna and the first branch means for detecting, on the basis of the frequency of the other oscillation signal branched by the first branch means, both a first signal of the upper sideband frequency of the received signal obtained via the receiving antenna, and a second signal of the lower sideband frequency of the received signal; a signal processing means operatively connected to the first mixer and processing the first and second signals to detect the relative velocity to the target, the signal processing means being adapted to detect a relative approach of the target by processing the first signal and to detect a relative separation of the target by processing the second signal.

According to the present invention, radio waves reflected from the target are received by the receiving antenna, and the received signal is inputted to the first mixer. When the target is relatively approaching the mobile object, the first signal of the upper sideband frequency of the received signal is detected by the first mixer on the basis of the frequency of the oscillation signal. Meanwhile, when the target is relatively separating from the mobile object, the second signal of the lower sideband frequency of the received signal is detected by the first mixer on the basis of the frequency of the oscillation signal. In the signal processing means, a relative approach of the target to the mobile object can be detected by processing the first signal, and a relative separation of the target from the mobile object can be detected by processing the second signal. It is further possible to detect the relative velocity between the mobile object and the target on the basis of the first and second signals.

The above and other objects, features and advantages of the present invention and the manner of realizing them will become more apparent, and the invention itself will best be understood from a study of the following description and the appended claims with reference to the attached drawings showing some preferred embodiments of the invention.

DESCRIPTION OF THE PREFERRED EMBODIMENT

Figure 13:
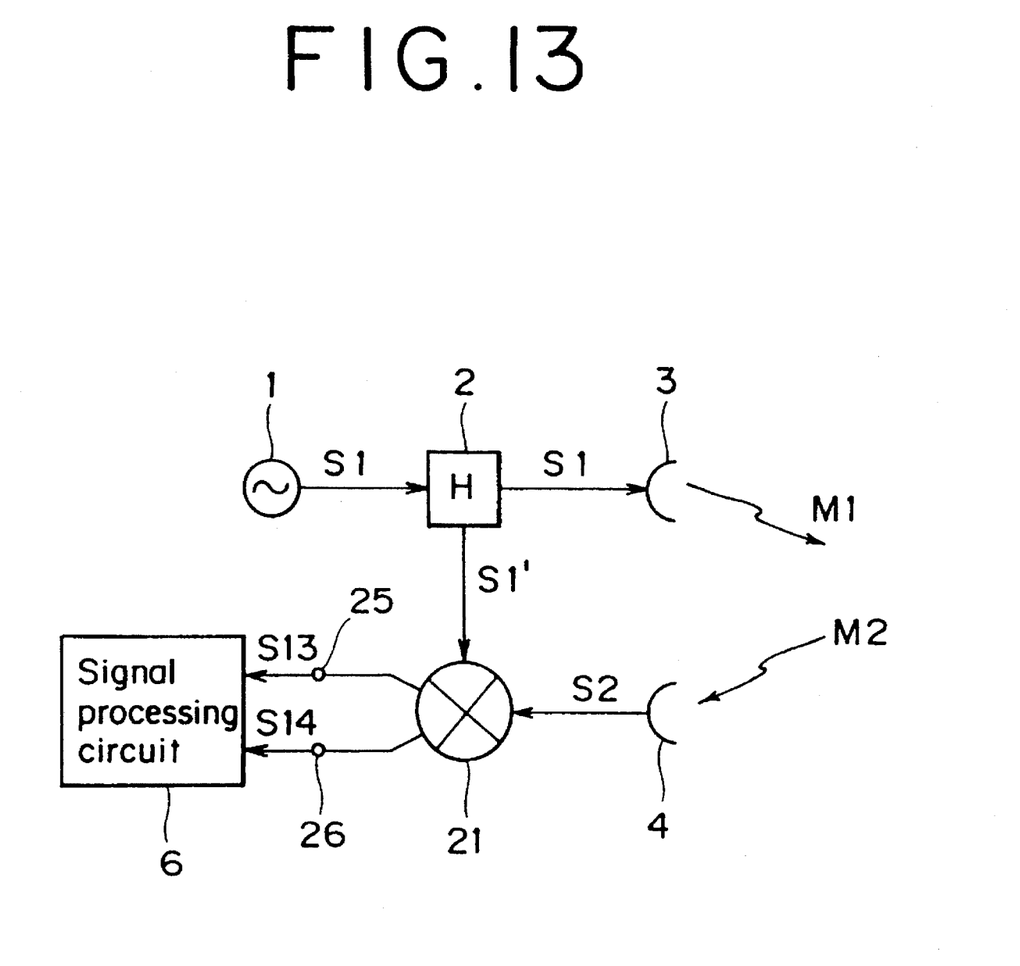
FIG. 13 is a block diagram of a continuous wave radar of a preferred embodiment of the present invention.

Hereinafter a preferred embodiment of the present invention will be described in detail with reference to the accompanying drawings. FIG. 13 is a block diagram of a CW radar according to the embodiment of the invention. In this diagram, like component circuits and elements corresponding to those in the conventional example of FIG. 1 are denoted by the same reference numerals, and a repeated explanation thereof is omitted here. In FIG. 13, there are omitted both a transmitter and a receiver connected respectively to a transmitting antenna 3 and a receiving antenna 4. Differing from the conventional example of FIG. 1, the CW radar shown in FIG. 13 employs an image cancel mixer 21 in place of the aforementioned mixer.

The image cancel mixer 21 is so formed as to be capable of extracting the upper sideband frequency and the lower sideband frequency of a Doppler-shifted received signal S2 on the basis of the frequency of an oscillation signal (transmitted signal) S1 generated from an oscillator 1. The upper sideband frequency is extracted when the frequency of the received signal S2 is higher than that of the transmitted signal S1. In this case, it is understood from the theory of the Doppler effect that a target such as a preceding car is relatively approaching. Meanwhile, the lower sideband frequency is extracted when the frequency of the received signal S2 is lower than that of the transmitted signal S1. In this case, it is understood that the preceding car is relatively separating.

Figure 14:
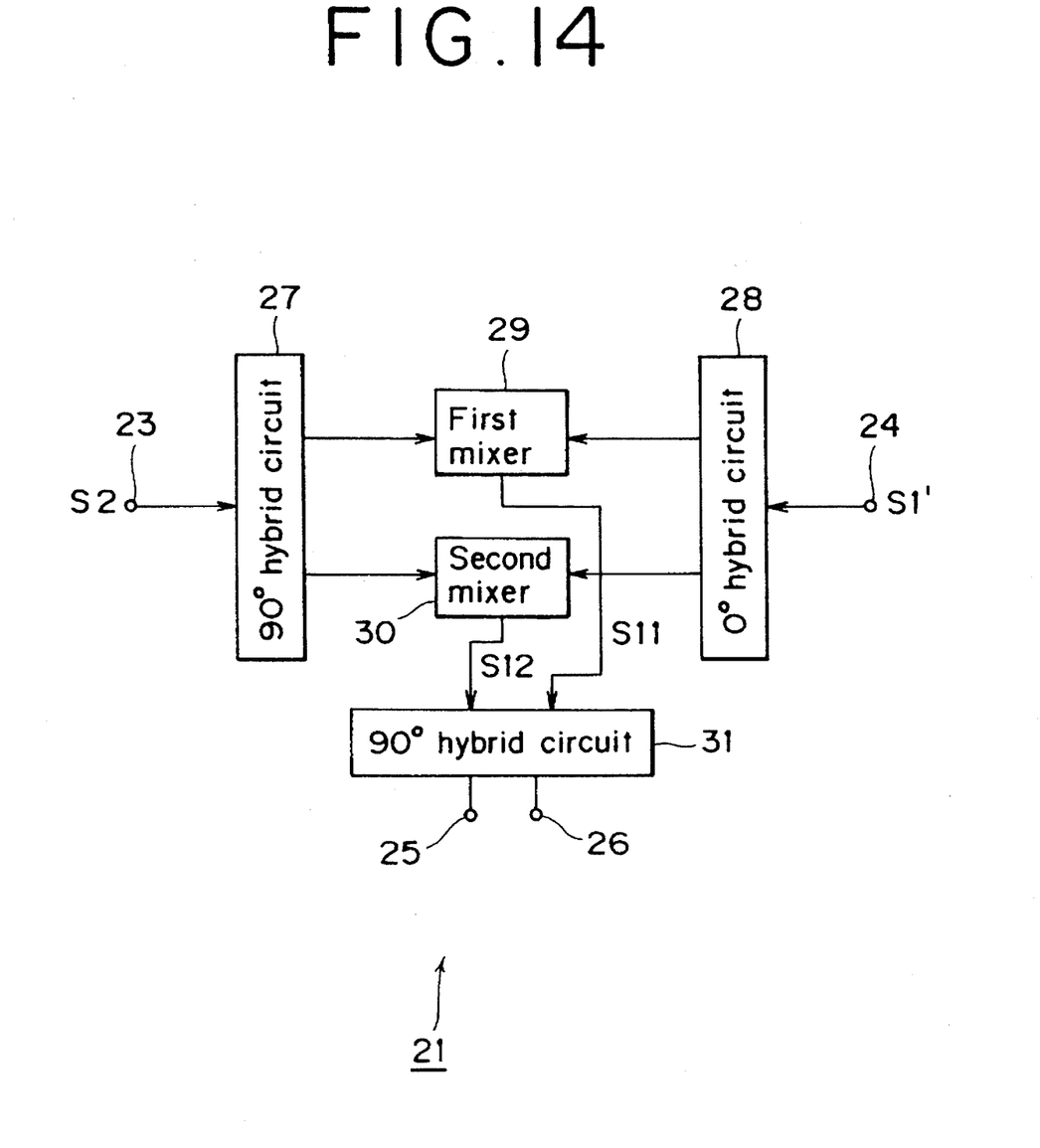
FIG. 14 is a block diagram of an image cancel mixer shown in FIG. 13.

The construction of the image cancel mixer 21 is shown in FIG. 14, which will now be described below. The image cancel mixer 21 of FIG. 14 comprises first and second input ports 23, 24; first and second output ports 25, 26; a 90° hybrid circuit 27 whose input terminal is connected to the first input port 23; a 0° hybrid circuit 28 whose input terminal is connected to the second input port 24; a first mixer 29 whose input terminals are connected to one output terminal of the 90° hybrid circuit 27 and one output terminal of the 0° hybrid circuit 28; a second mixer 30 whose input terminals are connected to the other output terminal of the 90° hybrid circuit 27 and the other output terminal of the 0° hybrid circuit 28; and a 90° hybrid circuit 31 whose input terminals are connected to the output terminals of the first and second mixers 29, 30 and whose output terminals are connected to the first and second output ports 25, 26.

The first input port 23 is supplied with a received signal S2 obtained from the receiving antenna 4 which is shown in FIG. 13 and serves to receive reflected waves M2. The second input port 24 is supplied with an output signal S1' of the oscillator 1 branched by the hybrid circuit 2. The received signal S2 supplied to the first input port 23 is inputted to the 90° hybrid circuit 27 to be thereby branched and, after a 90° phase shift, the shifted signal is fed to one input terminal of each of the first and second mixers 29, 30.

The signal S1' supplied to the second input port 24 is inputted to the 0° hybrid circuit 28 to be thereby branched into two, which are then fed to the other input terminals of the first and second mixers 29, 30. In the first mixer 29, the 90° phase-shifted received signal S2 is mixed with the output signal S1' of the oscillator 1, and the mixed signal is fed to one input terminal of the 90° hybrid circuit 31. This mixed signal is denoted by S11 here. In the second mixer 30, the 90° phase-shifted received signal S2 is mixed with the output signal S1' of the oscillator 1, and the mixed signal is then fed to the other input terminal of the 90° hybrid circuit 31. This mixed signal is denoted by S12 here.

The first and second mixers 29, 30 are so arranged that the signals S11 and S12 outputted therefrom have a 90° phase difference from each other. Such phase relationship is indicated by solid-line arrows 33 and 34 or broken-line arrows 35 and 36 in FIG. 15 which shows the configuration of the 90° hybrid circuit 31. In this diagram, the solid-line arrows 33 and 34 represent the phases obtained when the frequency of the received signal S2 is lower than that of the transmitted signal S1, while the broken-line arrows 35 and 36 represent the phases obtained when the frequency of the received signal S2 is higher than that of the transmitted signal S1. Such indications are applied also to the other solid-line arrows 37, 38, 39, 40 and broken-line arrows 41, 42, 43, 44.

Figure 15:
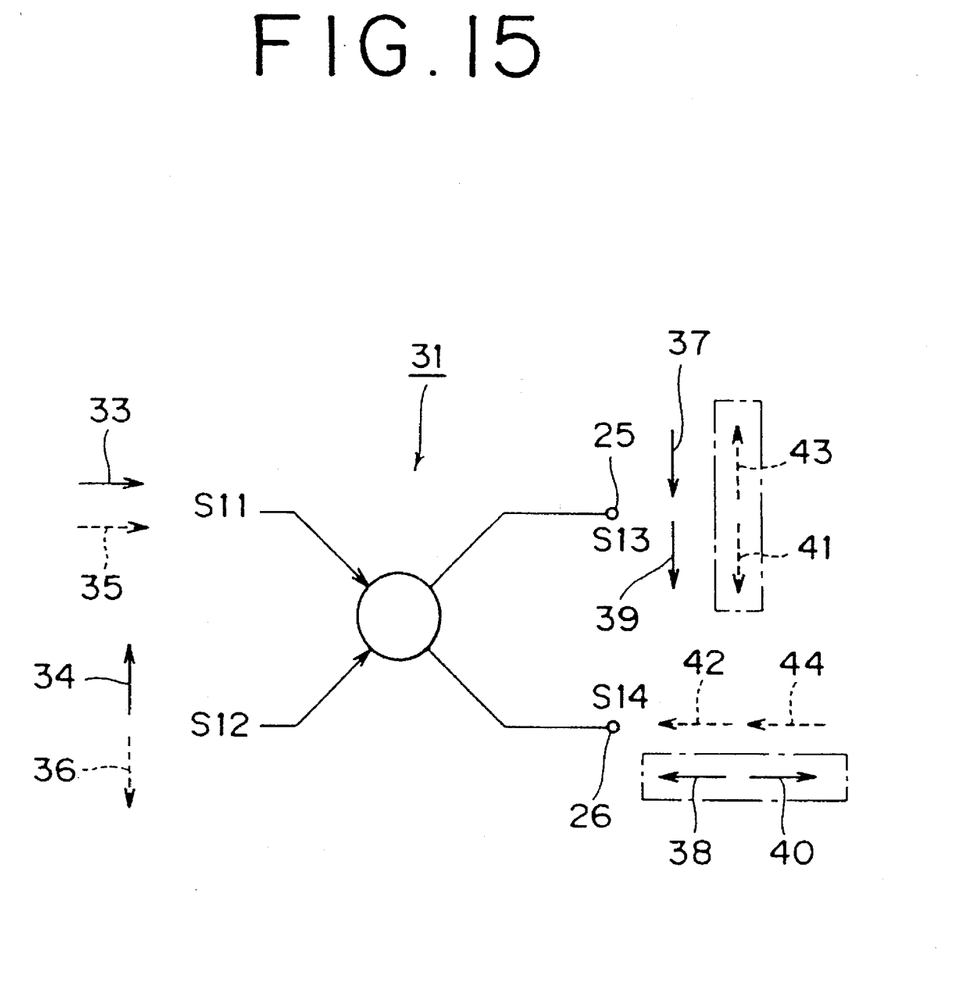
FIG. 15 is a schematic diagram of a 90° hybrid circuit to which first and second output ports shown in FIG. 14 are connected.

Suppose now that the signals S11 and S12 having the phase relation of the solid-line arrows 33 and 34 are inputted to the 90° hybrid circuit 31. In this case, the phase of the signal S11 represented by the solid-line arrow 33 is shifted by 90° as indicated by the solid-line arrow 37 and then is delivered to the first output port 25 while being shifted by 180° as indicated by the solid-line arrow 38 and delivered to the second output port 26. The phase of the signal S12 represented by the solid-line arrow 34 is shifted by 180° as indicated by the solid-line arrow 39 and then is delivered to the first output port 25 while being shifted by 90° as indicated by the solid-line arrow 40 and delivered to the second output port 26.

In this case, the signals S11 and S12 delivered to the second output port 26 mutually have an opposite-phase relation as indicated by the solid-line arrows 38 and 40, so that these two signals cancel each other. Meanwhile the signals S11 and S12 delivered to the first output port 25 mutually have an in-phase relation as indicated by the solid-line arrows 37 and 39, so that these two signals are combined with each other to become a signal S13, which is then fed from the first output port 25 to the signal processing circuit 6 shown in FIG. 14. The frequency of this output signal S13 from the mixer 31 is obtained when the frequency of the received signal S2 is lower than that of the transmitted signal S1, i.e., it signifies the lower sideband frequency of the received signal S2. Therefore, a relative separation of the preceding car can be detected by processing the signal S13 in the signal processing circuit 6.

Suppose next that the signals S11 and S12 having the phase relation of the broken-line arrows 35 and 36 are inputted to the 90° hybrid circuit 31. In this case, the phase of the signal S11 represented by the broken-line arrow 35 is shifted by 90° as indicated by the broken-line arrow 41 and then is delivered to the first output port 25 while being shifted by 180° as indicated by the broken-line arrow 42 and delivered to the second output port 26. The phase of the signal S12 represented by the broken-line arrow 36 is shifted by 180° as indicated by the broken-line arrow 43 and then is delivered to the first output port 25 while being shifted by 90° as indicated by the broken-line arrow 44 and delivered to the second output port 26.

In this case, the signals S11 and S12 delivered to the first output port 25 mutually have an opposite-phase relation as indicated by the broken-line arrows 41 and 43, so that these two signals cancel each other. Meanwhile the signals S11 and S12 delivered to the second output port 26 mutually have an in-phase relation as indicated by the broken-line arrows 42 and 44, so that these two signals are combined with each other to become a signal S14, which is then fed from the second output port 26 to the signal processing circuit 6. The frequency of this output signal S14 from the mixer 31 is obtained when the frequency of the received signal S2 is higher than that of the transmitted signal S1, i.e., it signifies the higher side-band frequency of the received signal S2. Therefore a relative approach of the preceding car can be detected by processing the signal S14 in the signal processing circuit 6.

According to the CW radar described hereinabove, it is possible to detect the state of the preceding car such as a relative approach or separation thereof. And the construction can be simplified by the use of a general oscillator 1 instead of a voltage controlled oscillator employed customarily in a conventional FM-CW radar as shown in FIG. 5, hence realizing a reduction of the scale and a curtailment of the production cost. Furthermore, due to the use of continuous waves to form the transmitted signal S1, no problem exists with regard to undesired generation of noise as observed usually in an FM-CW radar.

In addition to the above, the present invention is employable as a collision preventive radar since a relative approach or separation of a preceding car can be detected. In this case, the operation may be so performed as to exert a braking force when the distance to the preceding car has become shorter than a predetermined value. It is further to be noted that the present invention is usable as a radar for automatic driving control. This requirement can be met by decelerating or accelerating the radar-loaded car in accordance with a relative approach or separation to thereby maintain a predetermined safety distance from the preceding car.

Thus, according to the continual wave radar of the present invention described hereinabove, advantageous effects are attainable in detection of the relative velocity when the radar is loaded in a mobile object, and it is rendered possible to detect whether the mobile object is relatively approaching to or separating from the target. In addition, the construction can be downsized in a simplified structure without generation of any AM noise, and the production cost can be curtailed as well.

What is claimed is:

1. A continuous wave radar comprising:

an oscillation means for producing an oscillation signal of a fixed frequency;

a first branch means operatively connected to said oscillation means for branching the oscillation signal into two oscillation signals;

a transmitting antenna operatively connected to said first branch means for irradiating one of the oscillation signals branched by said first branch means;

a receiving antenna for receiving reflected waves irradiated originally from said transmitting antenna and reflected by a target;

a first mixer operatively connected to both said receiving antenna and said first branch means for detecting, on the basis of the frequency of another oscillation signal branched by said first branch means, a first signal of the upper sideband frequency of the received signal and a second signal of the lower sideband frequency of the received signal obtained via said receiving antenna; and a signal processing means operatively connected to said first mixer for processing the first signal and the second signal to detect the relative velocity to the target, said signal processing means being adapted to detect a relative approach of said target by processing the first signal and to detect a relative separation of said target by processing the second signal, said first mixer including an image cancel mixer, wherein said image cancel mixer comprises:

a second branch means for branching the received signal into two signals output therefrom with a 90° phase shift;

a third branch means for branching the oscillation signal into two signals output therefrom;

a second mixer operatively connected to said second and third branch means for mixing one output signal of said second branch means with one output signal of said third branch means and delivering a mixed signal therefrom;

a third mixer operatively connected to said second and third branch means for mixing the other output signal of said second branch means with the other output signal of said third branch means, and processing the mixed signal in such a manner that a phase thereof has a 90° phase shift from the output of said second mixer; and a fourth branch means operatively connected to said second and third mixers and having a first output terminal for outputting said first signal and a second output terminal for outputting said second signal, said fourth branch means being adapted for feeding the output signal of said second mixer with a 90° phase shift to the first output terminal and also with a 180° phase shift to the second output terminal, while feeding the output signal of said third mixer with a 180° phase shift to the first output terminal and also with a 90° phase shift to said second output terminal.

2. A continuous wave radar comprising:

an oscillation means for producing an oscillation signal of a fixed frequency;

a branch means operatively connected to said oscillation means for branching the oscillation signal into two oscillation signals;

a transmitting antenna operatively connected to said branch means for irradiating one of the oscillation signals branched by said branch means;

a receiving antenna for receiving reflected waves irradiated originally from said transmitting antenna and reflected by a target;

an image cancel mixer having a first input terminal connected to said receiving antenna for inputting a received signal obtained by said receiving antenna, a second input terminal connected to said branch means for inputting the other oscillation signal branched by said branch means, a first output terminal for outputting a first signal of an upper sideband frequency of the received signal in case the frequency of the oscillation signal is greater than a frequency of the received signal, and a second output terminal for outputting a second signal of a lower sideband frequency of the received signal in case the frequency of the oscillation signal is smaller than the frequency of the received signal; and a signal processing means operatively connected to said image cancel mixer for detecting a relative approach of said target by processing the first signal and detecting a relative separation of said target by processing the second signal.

* * * * *